Oct. 7, 1952     E. J. LEWIS     2,613,040
FILM HOLDER
Filed March 3, 1948
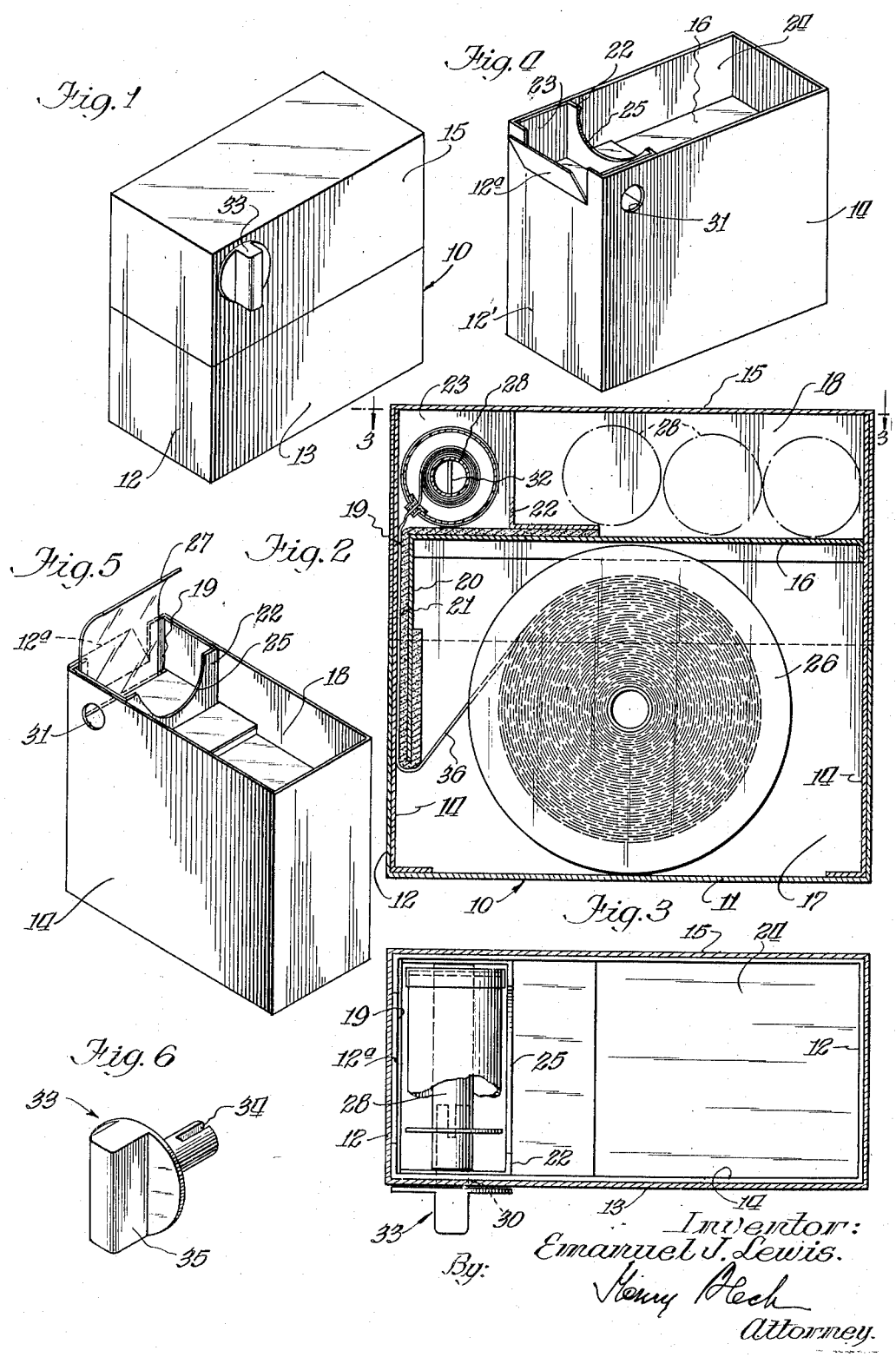
Inventor:
Emanuel J. Lewis.
By: Henry Hech
Attorney.

Patented Oct. 7, 1952

2,613,040

UNITED STATES PATENT OFFICE 2,613,040

FILM HOLDER

Emanuel J. Lewis, Chicago, Ill.

Application March 3, 1948, Serial No. 12,850

5 Claims. (Cl. 242—55)

1

The invention relates to a holder for film and other light sensitive material, and particularly concerns the original container in which the bulk film is supplied.

Films for photographic purposes are usually wound within cartridges which permit 18, 20 or 36 exposures necessitating a film length of respectively 27, 30 and 54 inches. These cartridges are rather expensive since the construction of the cartridges and the winding thereon of the film entails outlay for cost of the material and labor in winding. The difference of cost for cartridges accommodating 18, 20 and 36 exposures respectively is negligible.

It is, therefore, highly desirable in the interest of economy to buy the film in bulk or reels and wind the film in predetermined lengths on individual spools in cartridges to afford the desired number of exposures.

However, this method has its serious drawbacks since the transfer of film portions onto the cartridges requires the use of a dark room.

If a panchromatic film is employed, no light useful for practical purposes can be used so that the disassembly of the cartridge and the winding of the film thereon and its reassembly must be carried out in almost total darkness rendering the transfer of the film very difficult and time wasting.

Again in color film no light whatever may be used so that the various steps for transferring the film must be carried out in total darkness.

It is, therefore, the principal object of the invention to pack the bulk reel in such manner that the unwinding of a predetermined length of film from the bulk reel and the winding of the film onto a spool in a cartridge can be carried out in broad daylight and without the use of a dark room.

It is a further object to provide a container for the original packing of bulk film having two compartments, one for the reception of a bulk reel and the other for the reception of a cartridge, said compartments being in communication by a slot through which the free end of the film of the bulk spool is threaded and adapted to be secured to the spool in the cartridge for winding thereon.

It is a further object to provide means extraneous to the container for turning the spool in the cartridge for winding film portions thereon so that the sensitized film is not exposed to light during the transfer from the bulk spool to the cartridge.

With these and other important objects in view which will become apparent from a disclosure of

2 the invention, the latter comprises the means described in the following specification, particularly pointed out in the claims forming a part thereof, and illustrated in the drawing, in which:

Fig. 1 is a perspective view of a film holder constructed in accordance with my invention.

Fig. 2 is an enlarged longitudinal section through the holder.

Fig. 3 is a section on the line 3—3 of Fig. 2.

Fig. 4 is a perspective view of the holder with the cover removed.

Fig. 5 is a view similar to Fig. 4, and

Fig. 6 is a perspective view of a key.

Referring to the several views of the drawing, the holder for the original packaging of bulk film generally designated by 10 is a box like structure comprising a bottom wall 11, end walls 12, and side walls 13. A rectangular box 14 open at the top and bottom fits within the box 10 and extends thereabove. A cover 15 fits over the box 14 to close the same. A horizontal partition 16 is provided within the box 14 adjacent to the upper end of box 14 to define compartments 17 and 18. The partition 16 does not quite extend to the left end wall 12¹ as viewed in Fig. 3 to leave a space or slot 19 for a purpose hereinafter explained and is bent downwardly as at 20. A layer of felt 21 overlies the left end of the partition 16 and covers the portion 20 of the partition. The left end wall of box 14 as viewed in Fig. 4 has a tongue 12a struck out at the top.

A vertical partition 22 extends transversely in the compartment 18 near the left wall thereof to define chambers 23 and 24. The partition 22 has a semi-circular cut out portion 25.

A reel 26 carrying film in bulk is placed in the compartment 17 and the film lead 27 extends through the slot 19 and projects into the chamber 23.

When it is desired to transfer a predetermined length of film the cover 15 is removed and the film lead 27 is secured to the spool in the cartridge 28 in the chamber 23 as will be readily understood by those versed in the art. Thereafter the cover is placed on the box. The cover and the side wall of box 14 are each provided with an opening 30 and 31 respectively, which are so arranged that they register with the longitudinal axis of the cartridge and a cross pin 32.

A key 33 having a slotted stem 34 and a knob 35 is inserted through the openings 30 and 31 until the cross pin 32 is received in the slotted stem.

Thereupon the key is turned to impart rotation to the spool on which thereby a length of film 36 from the reel 26 is wound.

Indications or legends may be placed on the box 10 to inform the user how many turns of the spool in the cartridge are necessary to wind a desired length of film thereon.

Thereafter the cover is lifted and the film 36 cut at the cartridge which latter may be removed and used for photographic purpose.

It is evident that the use of a dark room is thereby obviated.

The tongue 12a facilitates the handling of the cartridge and the cut out portion of partition 25 facilitates grasping of the cartridge.

The chamber 24 serves as a storage place for additional cartridges 28.

It is, of course, understood that the particular construction of the box is only indicated by way of illustration and may be varied.

The drawing illustrates one embodiment of the invention.

Numerous changes and alterations may be made without departing from the spirit of the invention.

I, therefore, do not limit myself to the details of construction and arrangement of parts, as shown, but include all modifications, revisions, and re-arrangements which fairly fall within the scope of the invention as defined in the appended claims.

I claim:

1. A merchandising and storage package for wound bulk photographic film which is to be threaded into magazines without exposure to light, said package comprising a box housing the bulk film, partition means in said box to confine said film and shield the same from light and dividing said box into two adjoining upper compartments one of which constitutes a magazine-loading compartment and includes a sidewall of the box, a movable tab portion in said sidewall providing an access opening into said loading compartment for manipulation of a magazine therein, means in said box defining a light-proof film-threading passage for leading the bulk film past said partition means into said magazine compartment, cover means for said box to fit over said tab and close said magazine compartment, at least, and a magazine-winding device insertible into said magazine compartment for engagement with a magazine therein.

2. A merchandising package for reeled bulk photographic film and including a box, a cover telescoping upon the box, insert partition means positioned in the box dividing the same into a light-tight lower storage compartment for the bulk film and upper compartment opening outwardly of the box at the top thereof, said partition means including an elongated linear offset extension at an end thereof spaced closely opposite an inner sidewall of the box, said extension spaced from said inner sidewall to provide a film-threading passage from said lower compartment into said upper compartment, means secured to said extension and providing a light seal for said passage, further partition means dividing said upper compartment into a magazine-loading chamber and a magazine-storage chamber, said cover and box having registerable spindle-openings for passage of a magazine-winding spindle into said loading chamber when the cover is fitted on the box.

3. A construction according to claim 2 in which said loading compartment adjoins a sidewall of the box having a yieldable tab movable for access to a magazine in said loading compartment for manipulation of the magazine, said tab being shielded by said cover fitted in closed relation with said box.

4. A construction according to claim 3 in which said further partition means is opposite said tab and is cut away crosswise of the box to provide a relieved access portion opposite said tab to facilitate manipulation of a magazine relative to the loading chamber.

5. An article of manufacture in the form of an original sales package of bulk photographic film contained in a throw-away box, said package comprising a box of cheap, expendible, light-proof material of the class of cardboard and having an internal depth substantially greater than a predetermined diameter of a roll of bulk film adapted to be contained in said box as packaged merchandise, said box having a cardboard partition member fitted into the box and dividing the same into a shallow, horizontal upper compartment, open at the top of the box, and a relatively deeper and closed lower compartment, said lower compartment being of a depth to receive said bulk film and being closed off by said partition, and the latter forming the floor for the upper compartment, and meeting part but not all of the inside wall surfaces of said box, means in said box including an offset tongue on said partition defining a narrow, light-obstructing film passage leading past said partition at the point where it does not meet the inside wall surface, as aforesaid, for movement of film from the lower to the upper compartment, a cover for said box and including pendant sidewall portions fitting over said top of the box in overlapping light-blocking relation with wall portions of said box bordering said upper compartment, and closing off the latter, a pendant sidewall portion of said cover and a sidewall portion of said upper compartment having registerable openings for passage of a magazine winding spindle into said upper chamber when the cover is closed, said upper compartment being of a depth to receive a magazine to be loaded from said bulk film, and said box being adapted to be discarded when the supply of bulk film is exhausted.

EMANUEL J. LEWIS.

REFERENCES CITED

The following references are of record in the file of this patent:

UNITED STATES PATENTS

| Number | Name | Date |
| --- | --- | --- |
| 2,219,722 | Lloyd | Oct. 29, 1940 |